(12) United States Patent
Mulligan et al.

(10) Patent No.: US 7,673,007 B2
(45) Date of Patent: Mar. 2, 2010

(54) WEB SERVICES PUSH GATEWAY

(75) Inventors: Michael Mulligan, Tampere (FI); Petri Nykänen, Nokia (FI); Jouni Toijala, Espoo (FI)

(73) Assignee: Nokia Corporation, Espoo (FI)

( * ) Notice: Subject to any disclaimer, the term of this patent is extended or adjusted under 35 U.S.C. 154(b) by 22 days.

(21) Appl. No.: 11/890,537

(22) Filed: Aug. 6, 2007

(65) Prior Publication Data

US 2008/0140789 A1      Jun. 12, 2008

Related U.S. Application Data

(63) Continuation of application No. 09/996,406, filed on Nov. 20, 2001, now Pat. No. 7,254,614.

(51) Int. Cl.
*G06F 15/16* (2006.01)
*G06F 15/173* (2006.01)

(52) U.S. Cl. .................................... 709/207; 709/238

(58) Field of Classification Search ................ 709/207, 709/238
See application file for complete search history.

(56) References Cited

U.S. PATENT DOCUMENTS

| | | |
|---|---|---|
| 6,421,714 B1 | 7/2002 | Rai et al. |
| 6,473,413 B1 | 10/2002 | Chiou et al. |
| 6,640,097 B2 | 10/2003 | Corrigan et al. |
| 6,654,363 B1 | 11/2003 | Li et al. |
| 6,728,215 B1 | 4/2004 | Alperovich et al. |
| 6,742,036 B1 | 5/2004 | Das et al. |
| 6,785,255 B2 | 8/2004 | Sastri et al. |
| 6,829,474 B1 | 12/2004 | Adachi |
| 6,915,345 B1 | 7/2005 | Tummala et al. |
| 6,934,756 B2 | 8/2005 | Maes |

(Continued)

FOREIGN PATENT DOCUMENTS

EP      1 081 916 A2      3/2001

(Continued)

OTHER PUBLICATIONS

Deason, Internet Engineering Taskforce, "SIP for SOAP Sessions", Apr. 23, 2002, http://www.potaroo.net/ietf/old-ids/draft-dearson-sipping-soap-sessions-00.txt, printed from internet Jan. 21, 2004.

(Continued)

*Primary Examiner*—Paul H Kang
(74) *Attorney, Agent, or Firm*—Ditthavong Mori & Steiner, P.C.

(57) ABSTRACT

A system and method for interfacing Web Services push applications and mobile terminals operable with one of a plurality of different mobile push technologies. A Web Services push gateway includes a Web Services endpoint to terminate Web Services protocols utilized by the Web Services push applications in providing push messages. A plurality of mobile push bearers are each configured to communicate with a different one of the plurality of mobile push technologies. The Web Services push gateway includes a push router coupled to the Web Services endpoint to receive the push messages, and to forward the push messages to an elected one of the mobile push bearers, from where is it ultimately delivered to a recipient mobile terminal employing a mobile push technology corresponding to the elected mobile push bearer.

37 Claims, 7 Drawing Sheets

U.S. PATENT DOCUMENTS

| | | |
|---|---|---|
| 6,937,588 B2 | 8/2005 | Park |
| 6,957,262 B2 | 10/2005 | Kimura et al. |
| 7,031,718 B2 | 4/2006 | Jouppi et al. |
| 7,103,676 B2 | 9/2006 | Payrits et al. |
| 2001/0019951 A1 | 9/2001 | Haumont et al. |
| 2001/0042081 A1 | 11/2001 | Macfarlane et al. |
| 2001/0044849 A1 | 11/2001 | Ndili et al. |
| 2002/0034941 A1 | 3/2002 | Patil et al. |
| 2002/0059452 A1 | 5/2002 | Yokota et al. |
| 2002/0087674 A1 | 7/2002 | Guilford et al. |
| 2002/0123335 A1 | 9/2002 | Luna |
| 2002/0154642 A1 | 10/2002 | Hagirahim et al. |
| 2002/0155848 A1 | 10/2002 | Suryanarayana |
| 2002/0156831 A1 | 10/2002 | Suorsa et al. |
| 2002/0174117 A1 | 11/2002 | Nykanen |
| 2002/0184373 A1 | 12/2002 | Maes |
| 2002/0186684 A1 | 12/2002 | Shaughnessy et al. |
| 2002/0187775 A1 | 12/2002 | Corrigan et al. |
| 2003/0005132 A1 | 1/2003 | Nguyen et al. |
| 2003/0009523 A1 | 1/2003 | Lindskog et al. |
| 2003/0013434 A1 | 1/2003 | Rosenberg et al. |
| 2003/0018704 A1 | 1/2003 | Polychronidis et al. |
| 2003/0031160 A1 | 2/2003 | Ang et al. |
| 2003/0033369 A1 | 2/2003 | Bernhard |
| 2003/0050051 A1 | 3/2003 | Vilander |
| 2003/0065805 A1 | 4/2003 | Barnes |
| 2003/0072451 A1 | 4/2003 | Pimentel et al. |
| 2003/0074456 A1 | 4/2003 | Yeung et al. |
| 2003/0078962 A1 | 4/2003 | Fabbricatore et al. |
| 2003/0084177 A1 | 5/2003 | Mulligan |
| 2003/0095540 A1 | 5/2003 | Mulligan et al. |
| 2003/0105864 A1 | 6/2003 | Mulligan et al. |
| 2003/0172090 A1 | 9/2003 | Asunmaa et al. |
| 2003/0185359 A1 | 10/2003 | Moore et al. |
| 2003/0187992 A1 | 10/2003 | Steenfeldt et al. |
| 2003/0190887 A1 | 10/2003 | Hook et al. |
| 2004/0087336 A1 | 5/2004 | Payrits et al. |
| 2004/0148434 A1 | 7/2004 | Matsubara et al. |
| 2004/0215824 A1 | 10/2004 | Payrits |
| 2005/0004968 A1 | 1/2005 | Mononen et al. |
| 2005/0071419 A1 | 3/2005 | Lewontin |
| 2005/0071423 A1 | 3/2005 | Rajaniemi |
| 2005/0071448 A1 | 3/2005 | Katz et al. |
| 2006/0015579 A1 | 1/2006 | Sastri et al. |

FOREIGN PATENT DOCUMENTS

| | | |
|---|---|---|
| EP | 1 130 933 A1 | 9/2001 |
| WO | 01/43390 A2 | 6/2001 |

OTHER PUBLICATIONS

Handley et al., Network Working Group, "SIP: Session Initiation Protocol", RFC 2543, Mar. 1999, http://www.ietf.org/rfc/rfc2543.txt.

Liberty Alliance Project, "Liberty Architecture Overview", Version 1.1, Jan. 15, 2003.

Liberty Alliance Project, "Liberty ID-WSF Interaction Service Specification," Version 1.0, 2003.

Liberty Alliance Project, "Liberty Reverse HTTP Binding 1.0", Version 1.0-07, 2003.

"SMS Text Messaging Web Service", www.webservicebuy.com, last updated Oct. 17, 2001, pp. 1-105.

Wireless Application Protocol, "Architecture Specification", WAP-210-WAPArch-20010712, Jul. 12, 2001.

Wireless Application Protocol, "Push OTA Protocol", WAP-235-PushOTA-20010425-a, Apr. 25, 2001.

W3C Recommendation, "SOAP Version 1.2 Part 2: Adjuncts", Jun. 26, 2002, http://www.w3.org/TR/2002/WD-soap12-part2-20020626.

W3C Recommendation, "SOAP Version 1.2 Part 1: Messaging Framework", Jun. 26, 2002, http://www.w3.org/TR/2002/WD-soap12-part1-20020626.

W3C Recommendation, "XPointer Framework", Nov. 13, 2002, http://www.w3.org/TR/2003/REC-xptr-framework-20030325.

Office Action for corresponding Chinese Patent Application No. 02823091.4, dated Jul. 17, 2009, pp. 1-8.

European Office Action for corresponding EP Application No. 02 783 350.8-2416, Nov. 19, 2009, Europe.

WEB SERVICES PUSH GATEWAY

CROSS REFERENCE TO RELATED APPLICATIONS

This is a continuation of application Ser. No. 09/996,406, entitled "Web Services Push Gateway", filed on Nov. 20, 2001 now U.S. Pat. No. 7,254,614, which is assigned to the assignee of the instant application, the contents of which are incorporated herein by reference.

FIELD OF THE INVENTION

The present invention relates generally to network communications systems, and more particularly, to a system and method for facilitating transmission of push messages from network applications to mobile terminals operating under multiple push technologies.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. The proliferation of local, regional, and global networks such as the Internet has availed a sea of information to society. These networking technologies have expanded to increasingly include wireless and mobile technologies. Through these networks, information can be downloaded to desktop systems, wireless systems, mobile systems, etc. For example, information available via the Internet can now be downloaded onto mobile wireless units, such as cellular telephones, personal digital assistants (PDAs), laptop computers, etc. One such technology facilitating the transfer of Internet content to and from wireless devices is the Wireless Application Protocol (WAP), which integrates the Internet and other networks with wireless network platforms. Generally, WAP is a set of protocols that accounts for characteristics and functionality of both Internet standards and standards for wireless services. It is independent of wireless network standards, and is designed as an open standard. WAP bridges the gap between the wireline Internet paradigm and the wireless domain, to allow wireless device users to enjoy the benefits of the Internet across both platforms.

Second generation wireless service, often referred to as 2G wireless service, is a current wireless service based on circuit-switched technology. 2G systems, such as Global System for Mobile communications (GSM) and Personal Communications Services (PCS), use digital radio technology for improved quality and a broader range of services over first generation mobile technologies. 3G, or third generation, refers to a set of digital technologies that promises improvements in capacity, speed and efficiency by deploying new packet-based transmission methodologies between terminals and the network. Users of 3G devices and networks will have access to multimedia services such as video-on-demand, video conferencing, fast web access and file transfer. Existing and future services are, and will continue to be, provided by network service operators who make services and applications available to mobile device users via the network.

One particular service feature currently available for communicating information is a "push" feature (also known as a "notification" feature or "alert" feature). In a typical client/server model, a client requests a service or information from a server, which then responds in transmitting information to the client. This is generally referred to as "pull" technology, where the client pulls the information from the server. For example, entry of a Uniform Resource Locator (URL) at a client device which is then dispatched to the server to retrieve the associated information is a pull transaction.

In contrast, "push" technology generally refers to a means to transmit information to one or more devices without a previous user action. Thus, there is no explicit request from the client before the server transmits its information, and therefore push technology essentially includes server-initiated transactions. Push technologies can be used in connection with various protocols and communication technologies. For example, some representative push technologies include Short Message Service (SMS), Wireless Application Protocol (WAP) Push, Multimedia Messaging Service (MMS), Session Initiation Protocol (SIP), as well as others.

Thus, there are currently a large number of mobile push technologies, and the future will only bring further increases in the number of mobile push technologies that are available. Each of these push technologies has its own particular characteristics, and therefore the generation and delivery of push messages to each of these different push technologies typically requires specialized knowledge applicable only to that technology. Current network applications that have the capability to push messages to recipient mobile devices are limited to technology-specific solutions. For example, an HTTP-SMS gateway only allows for a message to be sent from the Internet to an SMS-compliant terminal. With the continual increase of available push technologies, these brute force solutions become prohibitively undesirable, and present a significant obstacle for application developers who would prefer to focus on the development of the application, rather than determining how to push messages to an ever-increasing body of push technologies.

Accordingly, there is a need in the network communications industry to streamline the manner in which network applications provide push messages to multiple mobile push technologies utilized by the intended recipient mobile terminals. The present invention solves these and other shortcomings of the prior art, and offers numerous advantages over prior art systems and methodologies.

SUMMARY OF THE INVENTION

The present invention is directed to a system and method for facilitating the transmission of push messages from network applications to mobile terminals operating under multiple push technologies and protocols.

In accordance with one embodiment of the invention, a Web Services push gateway is provided for interfacing Web Services push applications and mobile terminals operable with one of a plurality of different mobile push technologies. The Web Services push gateway includes a Web Services endpoint to terminate Web Services protocols utilized by the Web Services push applications in providing push messages. A plurality of mobile push bearers are provided, each configured to communicate with a different one of the plurality of mobile push technologies. The Web Services push gateway further includes a push router coupled to the Web Services endpoint to receive the push messages. The push router is further coupled to the mobile push bearers to forward the push messages to an elected one of the mobile push bearers, from where is it ultimately delivered to a recipient mobile terminal employing a mobile push technology corresponding to the elected mobile push bearer.

In more particular embodiments of the Web Services push gateway, a presence agent is also provided. The presence agent is coupled to the push router to provide the push router with recipient presence information. This recipient presence information includes the recipient mobile terminal's online status and mobile terminal characteristics, where the push router's election of the elected mobile push bearer is based at least in part on the recipient presence information. In another particular embodiment, a user preference agent is provided, which is coupled to the push router to provide the push router with particular user preferences identified by the user of the recipient mobile terminal. The push router's election of the elected mobile push bearer is based at least in part on the user preferences. Further, another particular embodiment includes a push adaptation layer coupled to each of the mobile push bearers, to collect bearer characteristics from each of the mobile push bearers. The push router's election of the elected mobile push bearer is based at least in part on the bearer characteristics.

In accordance with another embodiment of the invention, a network system is provided for communicating push messages. The network system includes one or more mobile terminals capable of receiving push messages via one of a plurality of mobile push technologies. One or more Web Services applications capable of providing the push messages via Web Services protocols are also provided. A Web Services push gateway interfaces the push messages provided by the Web Services applications to any of the plurality of mobile push technologies.

In a more particular embodiment of the network system, the Web Services push gateway includes a first interface to receive the push messages via the Web Services protocols from the Web Services applications. The Web Services push gateway also includes a plurality of different push bearers, each of which is capable of transmitting the push messages to a recipient mobile terminal via a respective mobile push technology. A push message router is coupled to receive the push messages from the first interface, and to process bearer criteria and designate one of the mobile push bearers for transmitting the push messages in response thereto. The push message router also routes the push messages to the designated mobile push bearer for ultimate transmission to the recipient mobile terminal using the respective mobile push technology.

In accordance with another embodiment of the invention, a method is provided for facilitating the transmission of push messages to mobile terminals that collectively implement a plurality of different mobile push technologies. A first gateway interface to a Web Services domain is provided, where the Web Services domain includes at least one Web Service push application that transmits at least one push message. A second gateway interface to a mobile push technologies domain is also provided, where the mobile push technologies domain includes one or more mobile terminals each operable with at least one of the mobile push technologies. The push message received at the first gateway interface are routed to an elected one of a plurality of mobile push bearers. The push message from the elected mobile push bearer is transmitted to a recipient mobile terminal via the second gateway interface, where the push message is transmitted utilizing the mobile push technology provided by the elected mobile push bearer. In a more particular embodiment of this method, the push message received at the first gateway interface is converted from a Web Service protocol to a mobile push protocol associated with the elected mobile push bearer.

In yet another embodiment of the invention, a method is provided for facilitating the transmission of push messages to mobile terminals utilizing a plurality of different mobile push technologies. The method includes receiving the push messages from Web Services applications via Web Services protocols. Presence information relating to the availability and type of recipient mobile terminal is obtained, as is user preference information relating to particular user preferences identified by the user of the recipient mobile terminal. Bearer availability and capabilities information is obtained for each of a plurality of different mobile push bearers, each capable of communicating with the mobile terminals using a different mobile push technology. A mobile push bearer is selected to transmit the push message to the recipient mobile terminal based on one or more of the presence information, user preference information, and bearer availability and capabilities information. The push message is delivered from the selected mobile push bearer to the recipient mobile terminal using the mobile push technology provided by the selected mobile push bearer.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

Figure 1:
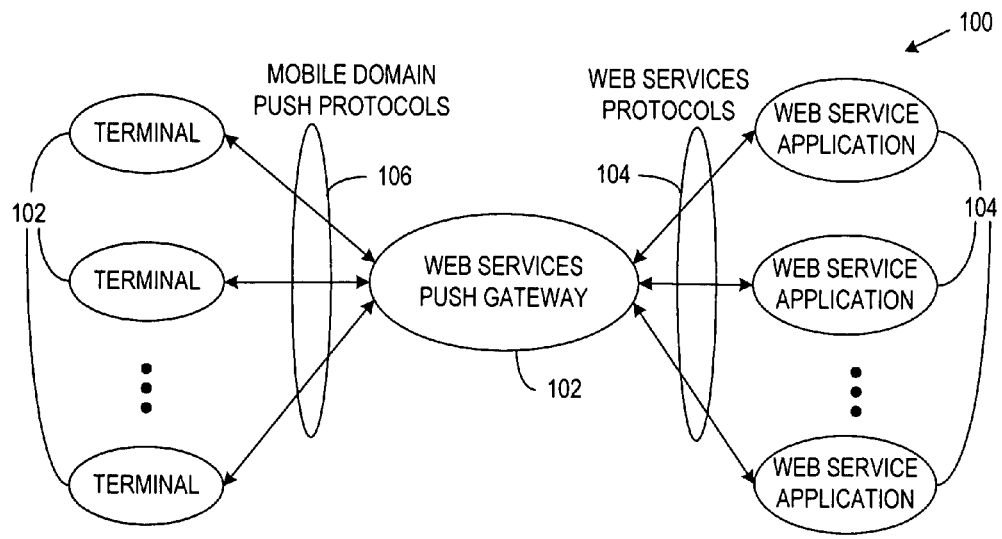
FIG. 1 is an exemplary embodiment of a network system which provides a Web Services push gateway in accordance with the principles of the present invention.

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention is directed to a system and method for facilitating transmission of push messages from network applications to mobile terminals operating under multiple push technologies. The present invention provides a Web Services push gateway that interfaces the Web Services domain and the mobile push technologies domain. This allows application developers to develop push applications without requiring specific knowledge of the push technology/ protocols used by the recipient mobile terminals. The Web Services push gateway of the present invention assumes the responsibility of determining the most appropriate push technology to use to deliver the message to the push message recipient, and effects the delivery using the selected, optimal push technology.

The present invention addresses networking technologies that include two major areas, namely Web Services and push technologies. Each of these are described more fully below.

Web Services are network-based (particularly Internet-based) modular applications that perform a specific task and conform to a specific technical format. Web services are represented by a stack of emerging standards that describe a service-oriented, component-based application architecture, collectively providing a distributed computing paradigm having a particular focus on delivering services across the Internet. Generally, Web services are self-contained modular applications that can be published in a ready-to-use format, located, and invoked across the World Wide Web. When a Web service is deployed, other applications and Web services can locate and invoke the deployed service. They can perform a variety of functions, ranging from simple requests to complicated business processes.

Advantageously, Web services are accessed via ubiquitous Web protocols and data formats, such as Hypertext Transfer Protocol (HTTP) and Extensible Markup Language (XML). Thus, at present, the basic Web service platform is XML plus HTTP. XML is a text-based markup language that is currently used extensively for data interchange on the Web. As with HTML, data is identified using tags, which are collectively known as "markup". XML tags identify the data, and act as a field name in the program. XML is a language that allows complex interactions between clients and services, as well as between components of a composite service, to be expressed. HTTP is an application protocol, and more particularly is a set of rules for exchanging files (text, graphic images, sound, video, and other multimedia files) on a network such as the World Wide Web. While the examples set forth herein are generally described in connection with XML and HTTP, it should be recognized that this is for illustrative purposes, and current and future types of protocols and data formats may also be employed.

More specifically, Web services represent a collection of several related technologies, and involve connections between at least two applications, such as a remote procedure call (RPC), in which queries and responses are exchanged in XML over HTTP. Web service technologies may be defined in terms of various technology layers. The core layers include a transport layer, such as TCP/IP or HTTP as previously described, in which XML messages may be communicated. An XML messaging layer, such as Simple Object Access Protocol (SOAP) also represents a core layer of Web services. SOAP is a protocol specification that defines a uniform manner of passing XML-encoded data, as well as defines a manner to perform RPCs using HTTP as the underlying communication protocol.

Higher level layers of the Web services stack include a service discovery layer, which may include technologies such as the Web Services Description Language (WSDL) and Universal Description, Discovery, and Integration (UDDI). WSDL is an XML-based description defining how to connect to a particular Web service, and thus indicates how service providers are to describe the basic format of Web service requests over different protocols or encodings. It is used to describe what a Web service can do, where it resides, and how to invoke it. UDDI provides a manner in which clients can dynamically locate other Web services. It represents a set of protocols and a public directory for the registration and real-time location of Web services and other business processes. UDDI provides a manner for Web service providers to register themselves, and provides a manner for an application to find, connect to, and interact with a particular Web service.

Other higher level layers of the Web services stack may include a workflow layer. A workflow layer may include a technology such as the Web Services Flow Language (WSFL). WSFL is an XML language for the description of Web Services compositions. It allows for recursive compositions of Web services within others to create more complex features built upon existing Web services.

The aforementioned, and other, technologies, protocols, data formats, etc. may be used in employing Web services. However, these known technologies are referenced in order to provide exemplary technologies currently available in the development and use of Web services. The invention thus may utilize these known technologies, but is also applicable to other existing and/or future technologies, as will be readily apparent to those skilled in the art from an understanding of the description provided herein.

Another networking principle that is addressed by the present invention includes "push" technologies. In a typical client/server model, a client requests a service or information from a server, which then responds in transmitting information to the client. This is generally referred to as "pull" technology, where the client pulls the information from the server. For example, entry of a Uniform Resource Locator (URL) at a client device which is then dispatched to the server to retrieve the associated information is a pull transaction.

In contrast, "push" technology generally refers to a means to transmit information to one or more devices without a previous user action. Thus, there is no explicit request from the client before the server transmits its information, and therefore push technology essentially includes server-initiated transactions.

Push technologies can be used in connection with various protocols and communication technologies. For example, some representative push technologies include Short Message Service (SMS), Wireless Application Protocol (WAP) Push, Multimedia Messaging Service (MMS), Session Initiation Protocol (SIP), as well as others. The Short Message Service (SMS) is the ability to send and receive text messages to and from mobile telephones. The SMS can be used to deliver a wide range of information to mobile phone users, and generally, any information that fits into a short message can be delivered by SMS. MMS, an evolution of SMS, is a new standard that is being defined for use in advanced wireless terminals. The service allows for non-real-time transmission of various kinds of multimedia contents like images, audio, video clips, etc. SIP is a signaling protocol used by, for example, voice-over-IP for controlling the call sessions. It is a newer form of the H.323 protocol. These information services can be configured as push-based services.

WAP is a technology facilitating the transfer of Internet content to and from wireless devices. WAP integrates the Internet and other networks with wireless network platforms. Generally, WAP is a set of protocols that accounts for characteristics and functionality of both Internet standards and standards for wireless services. It is independent of wireless network standards, and is designed as an open standard. WAP bridges the gap between the wireline Internet paradigm and the wireless domain, to allow wireless device users to enjoy the benefits of the Internet across both platforms. With respect to WAP Push technology, WAP specifies a general Protocol (Push Access Protocol) for the communication between a Push service provider and a push gateway of the wireless network. The gateway and the mobile device use a special protocol to communicate, such as Push Over-the-Air Protocol. More particularly, a push operation in WAP occurs when a push initiator (PI) transmits content to a client using either the Push Over-the-Air Protocol or the Push Access Protocol. The PI is on a network, such as the Internet, and the WAP client is in the WAP domain. The intermediary managing the communication between the PI and the WAP client is a WAP gateway. The PI contacts the gateway from the Internet side, delivering content using Internet protocols. The Internet side gateway access protocol is the Push Access Protocol, which uses eXtensible Markup Language (XML) messages that may be tunneled through various well-known Internet protocols such as the Hypertext Transfer Protocol (HTTP). The gateway forwards the pushed content to the WAP domain, where the content is transmitted over-the-air (OTA) in the mobile network to the WAP client. The WAP side (OTA) protocol is the Push Over-the-Air Protocol that is based on the Wireless Session Protocol (WSP), which is essentially a binary version of HTTP.

There are a large number of mobile push technologies, and more push technologies are likely to arise in the future. As is the case from the brief descriptions of representative push technologies, each of these technologies has its own characteristics, and each of these characteristics typically involves specialized knowledge only applicable to that technology. The present invention proposes a gateway between the Web Services domain and the Mobile Push technologies domain. The gateway abstracts the mobile technologies in such a way that a network (e.g., Internet) application developer can build applications without specific knowledge of the mobile domain.

FIG. 1 is an exemplary embodiment of a network system 100 which provides a Web Services push gateway 102 in accordance with the principles of the present invention. A primary function of the Web Services push gateway 102 is to convert from one protocol set to another. In the case of the Web Services push gateway of the present invention, the protocol conversion is from the Web Services protocols 104 (e.g., UDDI, WSDL, SOAP, etc.) to the Mobile Domain Push protocols 106 (e.g., SMS, WAP Push, SIP, MMS, etc.).

The Web Services push gateway 102 may be implemented as a network element in the network 100. The precise location of the network element is not particularly significant, except that it is logically positioned between the Web Service applications 104 that push messages and the terminals 102 to which the messages are to be pushed. While various environments may be employed to host these technologies, exemplary environments include a Java™ 2 Enterprise Edition (J2EE) Application Server, or a NET Application environment.

Figure 2:
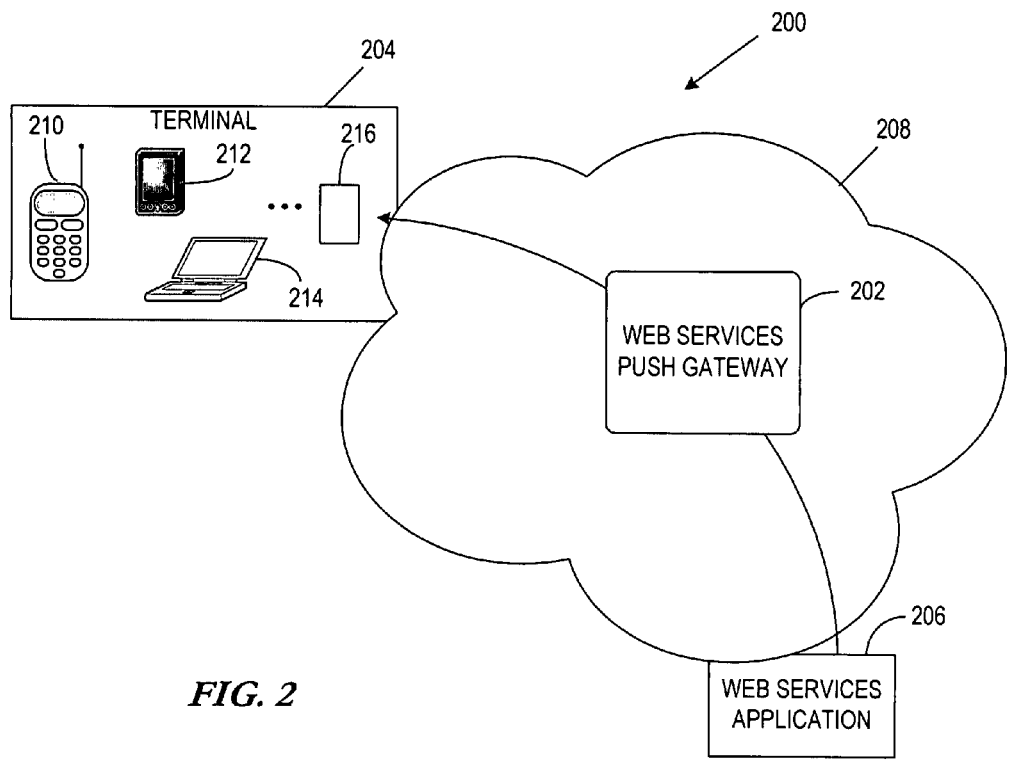
FIG. 2 illustrates a more particular embodiment of an exemplary network system employing a Web Services push gateway in accordance with the present invention.

FIG. 2 illustrates a more particular embodiment of an exemplary network system 200 employing a Web Services push gateway 202 in accordance with the present invention. The exemplary embodiment of FIG. 2 includes one or more mobile terminals 204, at least one Web Services application 206, and the Web Services push gateway 202. These network elements communicate over any one or more cooperating wireless and landline networks 208.

The wireless terminals 204 may include any type of mobile telecommunications or computing device. For example, the wireless terminal 204 may represent any of a number of mobile communication devices, such as a cellular telephone 210, a personal digital assistant (PDA) 212, a notebook or laptop computer 214, or any other type of terminal represented by device 216. The application 206 can be any Web Services application capable of pushing messages to a mobile terminal (e.g., terminal 204). The Web Services push gateway 202 in accordance with the present invention is described more fully below.

In accordance with the present invention, the Web Services push gateway connects the field of Web Services with those Mobile Domain technologies that employ push capabilities. For purposes of the present invention, push capabilities is broadly defined as the ability to send messages to a client terminal without the need for a prior pull request from the client. Therefore, while various particular push technologies may be described herein, the present invention is applicable to any push technology in which messages are pushed to a client terminal without prior client pull requests.

Figure 3:
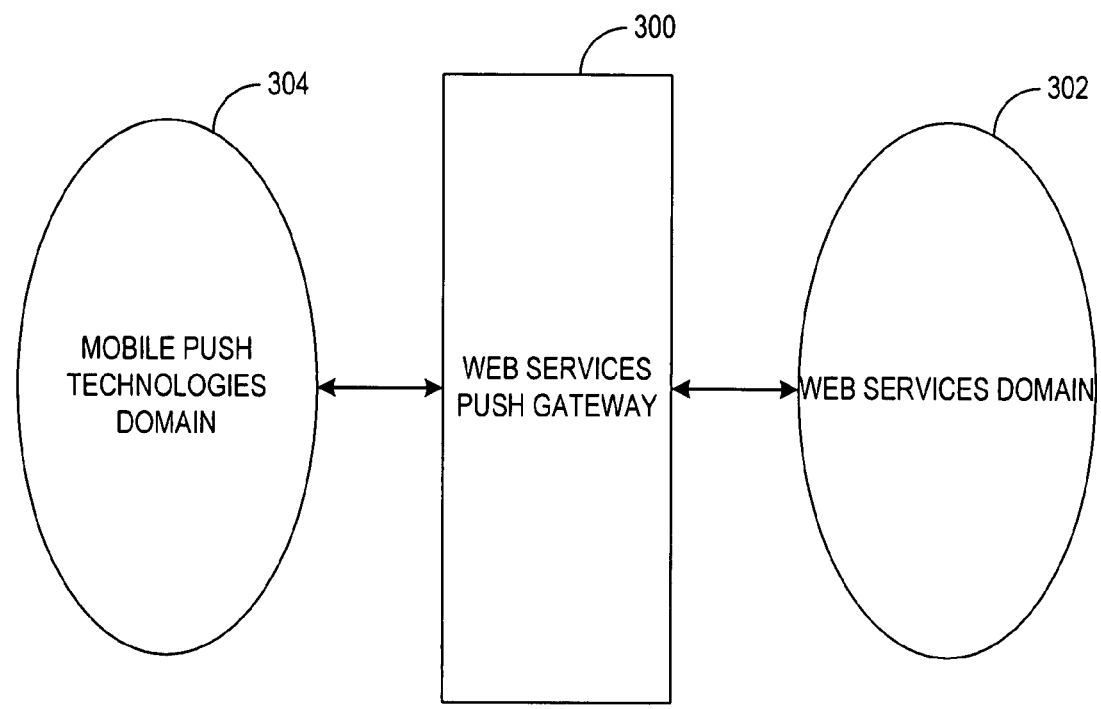
FIG. 3 is a block diagram generally illustrating a primary function of the Web Services push gateway according to the present invention.

FIG. 3 is a block diagram generally illustrating a primary function of the Web Services push gateway according to the present invention. The Web Services push gateway 300 provides a gateway between the Web Services domain 302 and the Mobile Push technologies domain 304. The Web Services push gateway 300 abstracts the mobile technologies in such a way that an Internet application developer can build applications without specific knowledge of the mobile domain.

More particularly, the present invention abstracts the core push service behind a single Internet paradigm, namely Web Services. This advantageously frees the Internet application developer from requiring mobile technology-specific knowledge. Further, the invention abstracts the entire range of mobile push technologies behind a single gateway. This frees the Internet developer from having to assess the advantages and disadvantages of particular push technologies. The Web Services push gateway 300 assumes the responsibility for deciding the most appropriate push technology to deliver the message to a particular user.

Figure 4:
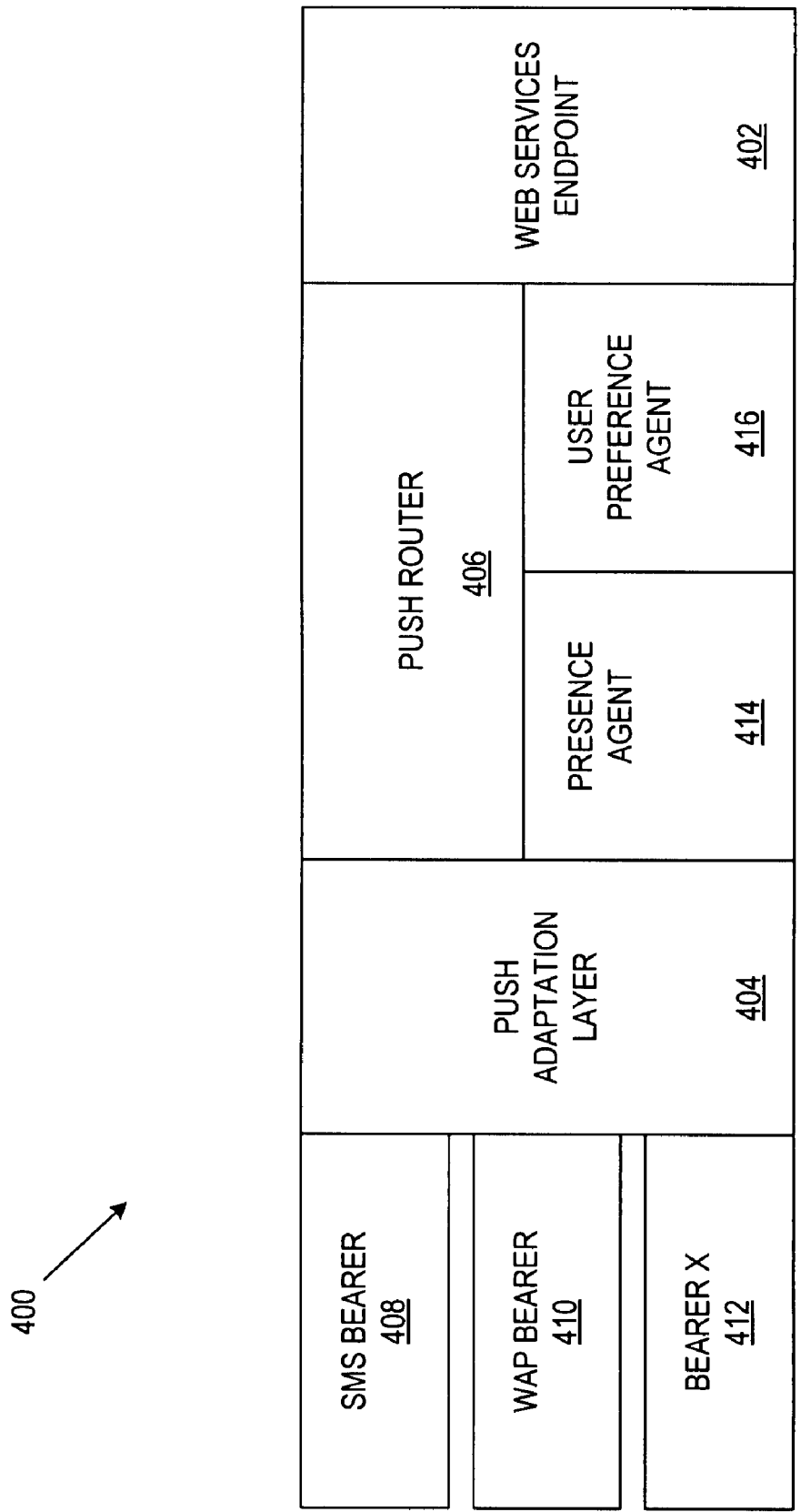
FIG. 4 is a block diagram illustrating an exemplary embodiment of a Web Services push gateway architecture in accordance with the principles of the present invention.

FIG. 4 is a block diagram illustrating an exemplary embodiment of a Web Services push gateway architecture 400 in accordance with the principles of the present invention. One primary function of the Web Services push gateway is to convert from one protocol set to another. For example, considering current Web Services protocols and Mobile Push protocols, such conversion may be from the Web Services protocols (e.g., UDDI, WSDL, SOAP, etc.) to the Mobile Push protocols (e.g., SMS, WAP, SIP, etc.). The Web Services push gateway architecture 400 shown in FIG. 4 illustrates an exemplary architecture for performing such functions.

Figure 5:
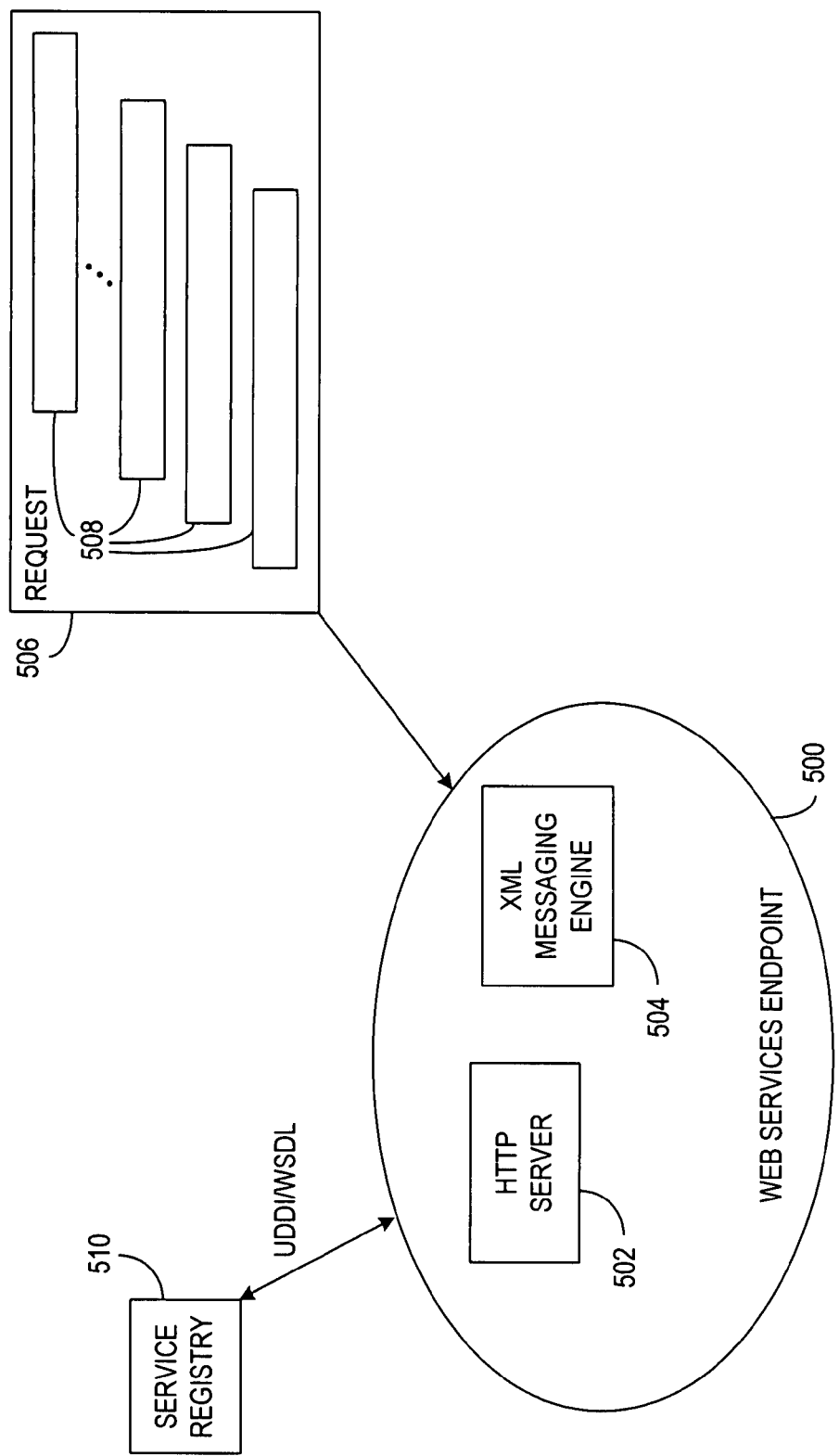
FIG. 5 is a block diagram of an exemplary Web Services endpoint that may be used in connection with the present invention.

The Web Services push gateway architecture 400 includes a Web Services endpoint module 402. This is the endpoint that terminates the Web Services protocols. An example of a Web Services endpoint is illustrated in FIG. 5. As shown in FIG. 5, the Web Services endpoint 500 includes at least a server, such as HTTP server 502, for the transport layer. However, other transport layers may be included, such as Simple Mail Transfer Protocol (SMTP), or other known or future transport layers. In addition, the Web Services endpoint 500 includes an XML messaging engine 504 to parse incoming requests 506 and generate appropriate responses. This XML messaging engine 504 can be implemented using, for example, a SOAP engine. The XML messaging engine 504 parses various parameters from data fields 508 within the request 506. The Web Services endpoint 500 can also interface with a service registry 510 in order to advertise it's push service. This capability can be implemented using, for example, the UDDI protocol and the WSDL definition language.

Returning to FIG. 4, the exemplary Web Services push gateway architecture 400 also includes a push adaptation layer 404. The push adaptation layer 404 provides a mobile technology-independent layer for the push router 406 (described below). The push adaptation layer 404 provides various functions, including two primary functions in accordance with one embodiment of the invention. The first of these primary functions is to provide a capability registry for the various mobile push bearers, such as the SMS bearer 408, WAP bearer 410, and any other bearers designated by bearer "X" 412 (described below). This registry allows the bearers to advertise their push capacity in various terms, such as bandwidth, content capability, availability, latency, assured delivery, quality of service, and the like. A second primary function of the push adaptation layer 404 is to forward the push message delivered by the push router 406 to the appropriate bearer 408, 410, 412.

The mobile push bearers 408, 410, 412 comprise a set of pluggable components. Each bearer has a specific function to connect to a specific mobile push technology. There are an indeterminate number of push technologies, particularly in view of future push technologies. For purposes of illustration, an SMS bearer 408 and WAP bearer 410 are specifically identified, while the bearer X 412 represents any number and type of current and/or future push technologies.

The SMS bearer 408 is used to connect to a Short Message Service Center (SMSC) to manage text messages. An SMSC is a network element through which short messages (e.g., via Short Messaging Service) may be transmitted, and stored for later transmission in the event that the message recipient is not reached. There are various protocols for such a connection, including, for example, the Computer Interface to Message Distribution (CIMD). A Short Message Entity (SME), commonly referred to as an application, is interconnected through the CIMD connection to a Message Center. The CIMD protocol is supported by various types of Message Centers, including the SMSC. A primary purpose of this interconnection is to transfer messages from the applications (i.e., SMEs) to the mobile stations, and from the mobile stations to the applications. The CIMD protocol is identified herein merely as a representative protocol in which the SMS bearer 408 can connect to an SMSC, however any appropriate protocol can alternatively be implemented.

An exemplary embodiment of the WAP bearer 410 complies with WAP Push Specifications. There are various possibilities for this bearer. A first possibility is that the bearer may connect to an existing WAP Push Proxy Gateway (PPG) using the WAP Push Access Protocol (PAP). The pushing of messages to a mobile client device is facilitated by the PPG between the wired and wireless networks. The PAP is a protocol used for conveying content to be pushed to a client, and related control information, between a Push Initiator (e.g., application/service) and the PPG. The PPG subsequently delivers the content to narrowband devices, such as wireless telephones, pagers, PDAs, laptop computers, etc.

Another possibility for the WAP bearer 410 is to communicate directly to terminals using the WAP Push Over-the-Air (POTA) protocol. The WAP POTA is an over-the-air protocol for delivery of content to a WAP terminal from a WAP server such as a PPG. In this case, the Web Services push gateway of the present invention also serves as the WAP PPG. Other connection possibilities for the WAP bearer 410, and the invention is not limited to the foregoing representative examples.

The bearer X 412 represents any other current and/or future pluggable components. Other examples include an MMS bearer that can be used for multimedia content. An MMS bearer can, for example, be based on the WAP MMS Specifications. Another example includes a SIP bearer that is able to send push messages using the SIP protocol. The architecture 400 supports any current or future pluggable components.

The presence agent 414 is an agent that supplies information to the push router 406. The presence agent 414 informs the push router 406 if and when a particular user is online. If the user is online, the presence agent 414 also supplies information regarding the characteristics of the terminal being used by the user at that moment. For example, if the user is using a first type of mobile device, then the only push messages that the user is capable of receiving might be text messages. On the other hand, a user using a second, more sophisticated type of mobile device may be able to receive additional types of content, such as multimedia messages. The presence agent 414 supplies this type of information to the push router 406 to identify the particular terminal characteristics.

The presence agent 414 may also inform the push router 406 of other details. For example, the presence agent 414 may notify the push router 406 of the capabilities of the underlying network under which the user is currently operating. These network capabilities may be in the form of network characteristics such as a second generation (2G) low bandwidth, third generation (3G) high bandwidth, etc. The presence agent 414 may provide many other types of details as well. For example, the presence agent 414 may provide status indicators, such as if the user is currently in a meeting, and does not want to receive messages that have audio content.

The user preferences agent 416 is another agent that supplies information to the push router 406. A primary purpose of the presence agent 416 is to inform the push router 406 of particular preferences of a user when receiving a push message. In this manner, a user can designate one or more user preferences that affect the transmission, presentation, or other characteristics associated with the push message.

In one embodiment of the invention, the user preferences agent 416 includes a repository of preferences associated with each user. When a push message is being communicated, this repository is accessed for that particular user to which the push message is directed, and the user preferences can be applied accordingly. In addition, the user preferences agent 416 may include an interface to allow the user to enter and/or edit those preferences. Such an interface may be implemented using a server, such as an HTTP server, which would allow users to edit their preferences via a web browser. Other interface implementations may also be used in accordance with the invention.

Any number of different types of user preferences identified by users may associated with the user preferences agent 416. For example, the user may identify terminal preferences that identify the range of terminals that the user possesses. The user can also designate the type of content to be received on each of these various terminals.

Another example of a user preference includes network preferences. This type of preference designation relates to the type of network the user is connected to at a given time. For example, the user can designate that high bandwidth messages are sent only while the user is connected to 3G networks, or that messages are not to be sent while roaming, etc.

Still another example of a user preference is a presence preference. These are preferences relating to the users activity at a particular time. For example, the user may designate that audio messages are not to be sent while in a meeting, when sleeping, or at any time in which an audio message would be disruptive or otherwise undesirable. The presence preferences may also be used to forward messages to another terminal, person, etc. when the particular terminal is offline.

Further, unsolicited messages from certain message origins may be ignored, messages with large attachments may be deferred, etc. The number and type of user preferences that can be implemented in this fashion is virtually endless.

At the heart of the Web Services push gateway 400 is the push router 406, which serves many purposes. Generally, the push router 406 receives the push messages from the Web Services endpoint 402, processes information received from one or more of the push adaptation layer 404, presence agent 414, and user preference agent 416, forwards the push message to the appropriate bearer based on the collected information, and provides delivery reports to the push message initiators. Exemplary embodiments of push router 406 functions are provided in connection with FIGS. 6 and 7.

Figure 6:
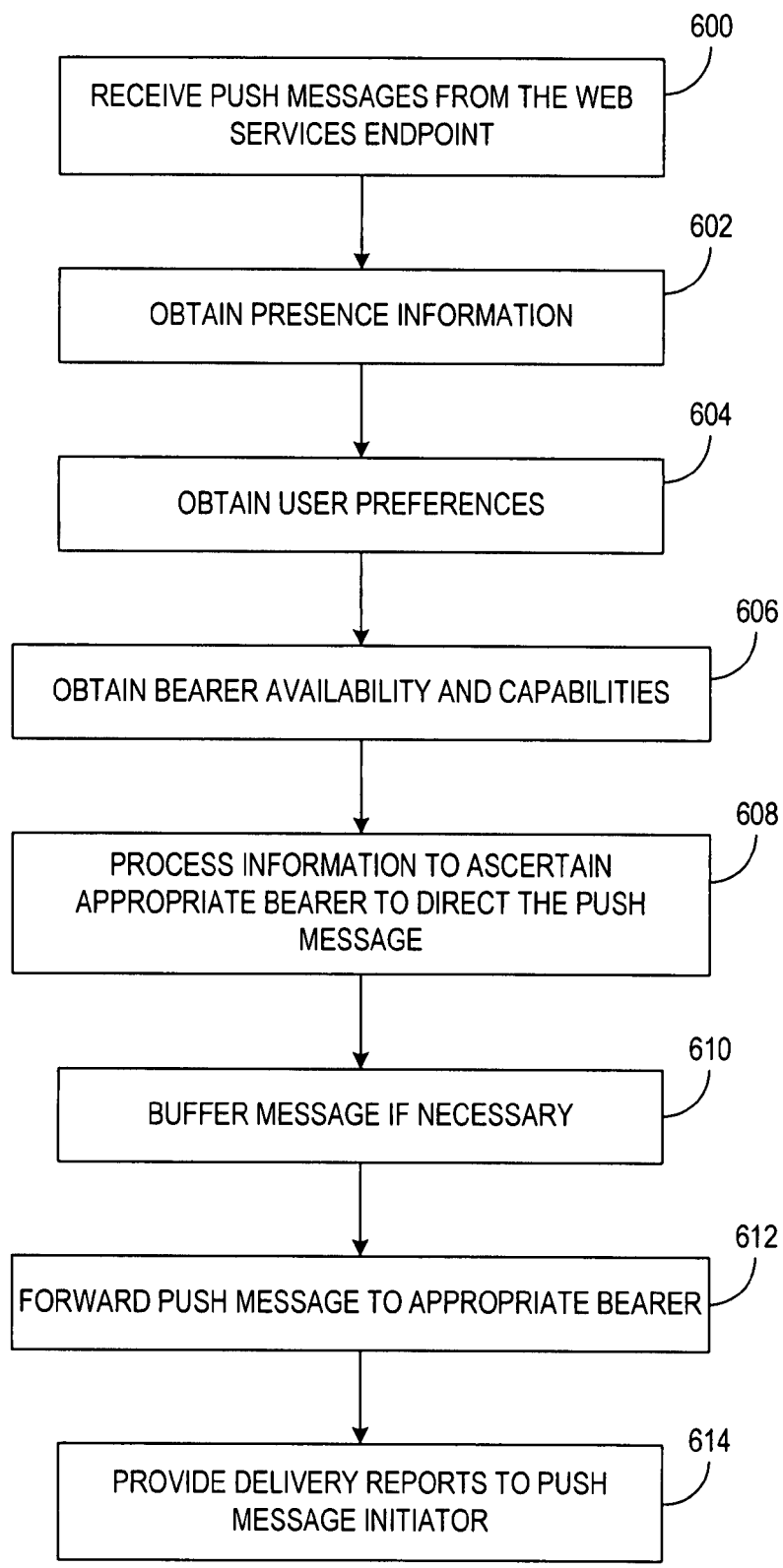
FIGS. 6 and 7 are flow diagrams illustrating exemplary embodiments of various functions that may be carried out by a push router in accordance with the invention.

FIG. 6 is a flow diagram illustrating one embodiment of various exemplary functions carried out by a push router in accordance with the principles of the present invention. As previously described, the Web Services endpoint serves as the endpoint that terminates the Web Services protocols. The push router receives the push messages from the Web Services endpoint, as shown at block 600. The push router then gathers information from one or more other modules associated with the Web Services push gateway. FIG. 6 illustrates examples of the type of information gathered by the push router. It should be noted that although the flow diagram of FIG. 6 is generally set forth as a series of functional blocks, this is for purposes of illustration only, as these functions needs not be carried out in a sequential manner.

In one embodiment, the push router obtains 602 the presence information described above from the presence agent. Similarly, the push router may obtain the user preferences from the user preference agent, and the bearer information from the push adaptation layer, as illustrated in blocks 604 and 606 respectively. When the desired information has been collected, the push router processes 608 this information to determine the appropriate bearer in which to direct the push message. When the push router has determined which bearer will be the recipient of the push message, it may be decided to buffer 610 the message. For example, if the collected information indicates that it is not an appropriate time for the user to receive the push message on the mobile terminal, the push message may be buffered 610. At a suitable time, or immediately if no buffering is required, the push message is forwarded 612 to the appropriate bearer. In one embodiment of the invention, the push router may deliver reports back to the push message initiator after the push message has been delivered to the appropriate bearer, as illustrated at block 614.

Figure 7:
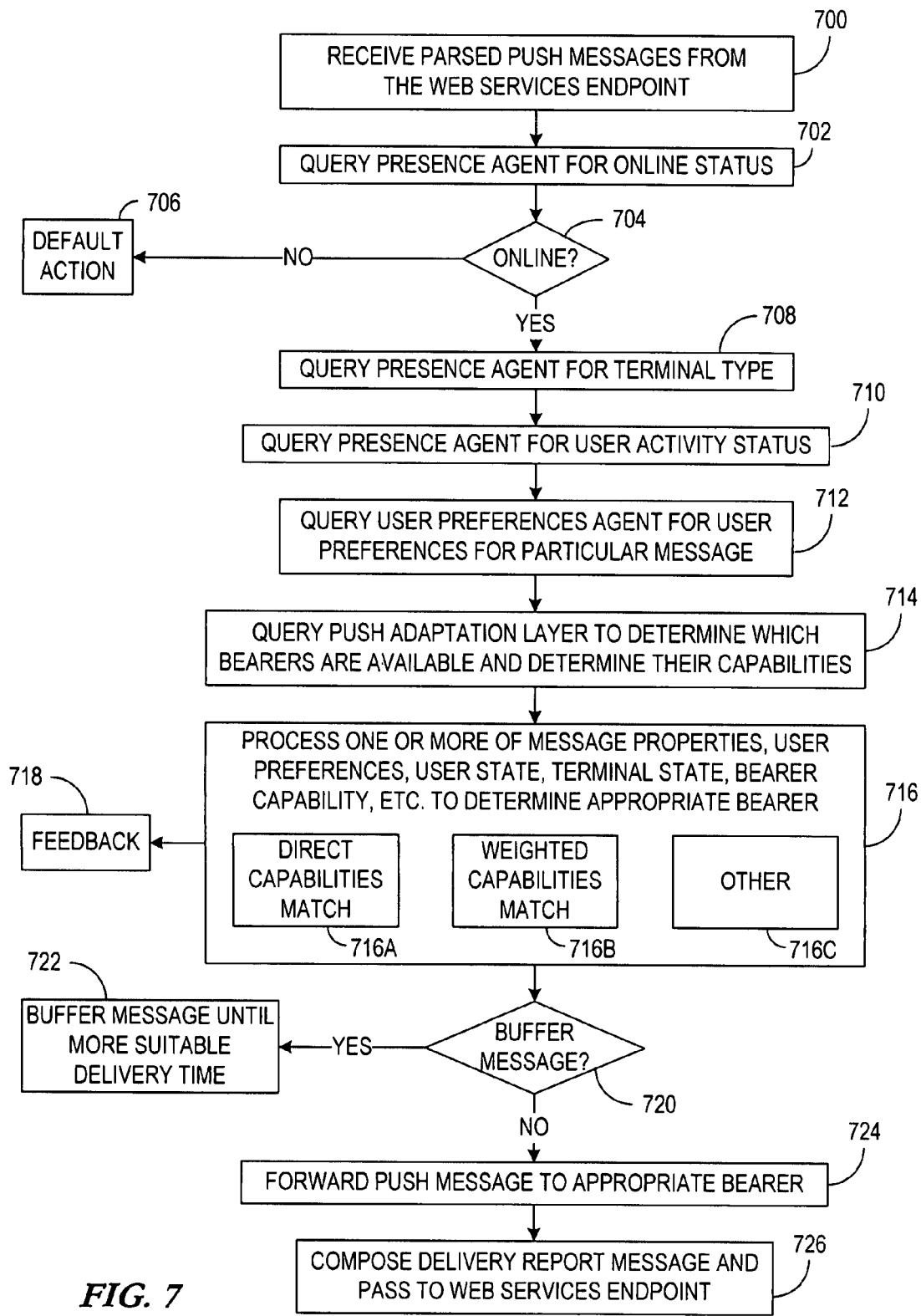

FIG. 7 is a flow diagram illustrating a more particular embodiment of various exemplary functions carried out by a push router in accordance with the principles of the present invention. As previously described, the Web Services endpoint serves as the endpoint that terminates the Web Services protocols, and includes a messaging engine (e.g., XML messaging engine implemented using SOAP) to parse incoming requests. The parsed push messages are received 700 from the Web Services endpoint by the push router.

Upon receiving a parsed push message, the push router obtains presence information from the presence agent. In one embodiment, this involves querying 702 the presence agent to determine if the intended recipient of the push message is online. The determination as to whether the intended recipient is online is made at decision block 704. If the intended recipient is not online, any default action may be taken as shown at block 706. For example, the push message may be disregarded or temporarily stored, or the user may be notified that a push message was presented when the user was not online. Any number of different default actions may be taken such an instance.

If the intended recipient is online, the push router queries 708 the presence agent to determine the terminal type that is being used. In addition, the push router queries 710 the presence agent to ascertain any information regarding the user's current activity status, such as if the recipient is in a meeting, or other status item that may have an impact on delivery of the push message.

The push router also obtains user preferences. In one embodiment, this involves querying 712 the user preferences agent to determine what the recipient's preferences may be for a particular message. For example, the user may have indicated a preference to block all messages that have been identified as unwanted messages (e.g., unsolicited messages from designated push initiators). Or, the user may have indicated a desire to prohibit receipt of push messages with large attachments. Any number of message characteristics may be identified by the user, and queried from the user preferences agent by the push router.

As shown at block 714, the push router then determines which bearers are available, and what the capabilities of these bearers are. Each registered bearer will have particular capabilities and offer different qualities of service. The push adaptation layer is privy to this information from each of the bearers, and the push router thus queries the push adaptation layer to obtain this information.

Based on the information from the different sources such as the presence agent, user preferences agent, and push adaptation layer, the push router determines which bearer is the appropriate bearer to send the push message. More particularly, the push router processes 716 information, including one or more of the message properties, user preferences, user state, terminal state, bearer capabilities, etc. in order to determine the appropriate bearer in which to forward the push message. Various manners of determining the appropriate bearer from this information can be utilized. For example, a simple match of bearer capabilities against the collected information may be employed, such as illustrated at block 716A. Alternatively, the features associated with the collected information may be weighted as shown at block 716B, in order to account for a prioritization of the importance of the various factors. Other manners of determining the appropriate bearer may also be utilized in accordance with the invention, as depicted by block 716C. Further, in accordance with one embodiment of the invention, a feedback 718 mechanism may be employed whereby the user (or sending application) provides feedback as to the quality of the push router's decision.

If the push message is not to be sent immediately, the message may be buffered until a more suitable time arises to send the message. A decision whether to buffer the message is made depending on the information collected by the push router, as shown at decision block 720. For example, if the user is in a meeting or otherwise unavailable, or is in a low bandwidth area, the push router will know this from the collected information, and a decision can be made to postpone delivery of the push message. In such a case, the message is buffered 722 or otherwise stored until a more suitable delivery time arises. In the context of the above example, this more suitable time may be when the user is out of the meeting, or is in a higher bandwidth area.

At a suitable time, or immediately if no buffering is required, the push router forwards the push message to the appropriate bearer as shown at block 724. In one embodiment of the invention, the push router provides delivery reports back to the push message initiator. More particularly, when the push router has completed its task of delivering the push message, the push router may compose a return message, and pass this return message to the Web Services endpoint for formatting and forwarding to the push initiator, as shown at block 726.

Figure 8:
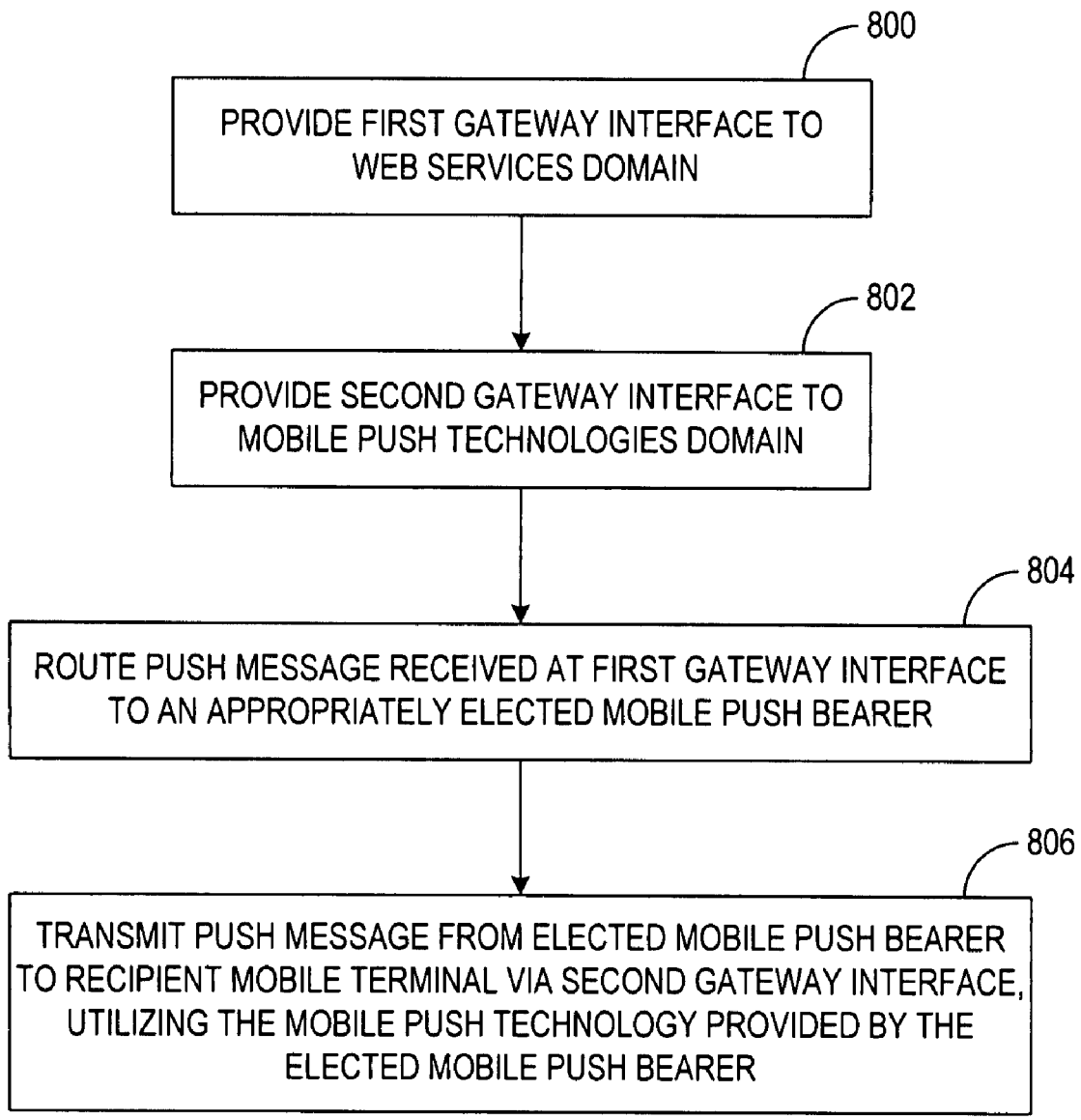
FIG. 8 is a flow diagram illustrating an exemplary embodiment of a method for facilitating transmission of push messages in accordance with the present invention.

FIG. 8 is a flow diagram illustrating an exemplary embodiment of a method for facilitating transmission of push messages in accordance with the present invention. The present invention bridges the field of Web Services with mobile domain technologies that employ push capabilities. As shown in FIG. 8, a first gateway interface to the Web Services domain is provided 800. The Web Services domain includes Web Service push applications that are capable of transmitting push messages. A second gateway interface to the mobile push technologies domain is provided 802. The mobile push technologies domain includes mobile terminals that can each operate with at least one mobile push technology. The push message received at the first gateway interface is routed to a particular one of the mobile push bearers, as shown at block 804. In one embodiment of the invention, the mobile push bearer in which the push message is routed is appropriately elected by the push router, based on criteria received from one or more of the push adaptation layer, the presence agent, the user preference agent, or another such agent providing relevant criteria.

The elected mobile push bearer transmits 806 the push message to the recipient mobile terminal via the second gateway interface. This transmission is effected by utilizing the mobile push technology provided by the elected mobile push bearer. For example, if the criteria results in the selection of an SMS bearer, the transmission to the recipient mobile terminal will be effected using a corresponding push technology, such as an SMS protocol. In accordance with another embodiment of the invention, the push message received at the first gateway interface is converted from a Web Service protocol to a mobile push protocol associated with the elected mobile push bearer.

In this manner, the core service (i.e., push service) is abstracted behind a single Internet paradigm (i.e., Web Services), thereby freeing the Internet application developer from needing mobile technology-specific knowledge. Further, the entire range of mobile push technologies is abstracted behind the single gateway, thereby freeing the Internet developer from having to assess the advantages and disadvantages of particular push technologies. The Web Services push gateway according to the present invention thus assumes the responsibility for deciding the most appropriate push technology to deliver the push message to a particular mobile terminal recipient.

It should be recognized that the aforementioned embodiments are representative examples of the various automatic detection and notification principles described herein, and the invention is not limited to these illustrated embodiments.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, hard disk drives, diskettes, optical disks, magnetic tape, semiconductor memories such as RAM, ROM, PROMS, etc. Transmitting devices include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

It will, of course, be understood that various modifications and additions can be made to the various embodiments discussed hereinabove without departing from the scope or spirit of the present invention. For example, the invention may be used in connection with any type of networking environment, ranging from local area networks to proliferative global area networks such as the Internet, and including cooperative landline and mobile networks. From the foregoing description of the illustrated embodiments, those of ordinary skill in the art will readily appreciate the applicability of the invention in any comparable network environment. Accordingly, the scope of the present invention should not be limited by the particular embodiments discussed above, but should be defined only by the claims set forth below and equivalents thereof.

What is claimed is:

1. An apparatus, comprising:
a web services endpoint to terminate web services protocols utilized by web services push applications in providing push messages and to parse the push messages;
a plurality of push bearers each configured to communicate with a different one of a plurality of push technologies;
a push adaptation layer configured to collect bearer characteristics from each of the push bearers; and
a push router disposed between the web services endpoint and the push bearers to elect one of the push bearers based on the bearer characteristics collected by the push adaptation layer, convert the parsed messages to a push protocol associated with the elected push bearer, and forward the push messages to the elected push bearer for ultimate delivery to a recipient terminal employing the push technology corresponding to the elected push bearer.

2. The apparatus as claimed in claim 1, further comprising a presence agent coupled to the push router to provide the push router with recipient presence information including the recipient terminal's online status and terminal characteristics, wherein the push router's election of the elected one of the push bearers is based at least in part on the recipient presence information.

3. The apparatus as claimed in claim 1, further comprising a user preference agent coupled to the push router to provide the push router with particular user preferences identified by the user of the recipient terminal, wherein the push router's election of the elected one of the push bearers is based at least in part on the user preferences.

4. The apparatus as claimed in claim 3, wherein the user preferences agent comprises a preference repository to store the user preferences for each potential push message recipient.

5. The apparatus as claimed in claim 3, further comprising a user preference interface coupled to the user preference agent to allow the user of the recipient terminal to enter and/or modify the user preferences.

6. The apparatus as claimed in claim 5, wherein the user preference interface is an HTTP server in which the user of the recipient terminal accesses via a web browser.

7. The apparatus as claimed in claim 1, further comprising a storage buffer to store one or more of the push messages if the push messages are not to be immediately sent, wherein a decision to store the one or more push messages is based on at least one of recipient presence information, user preferences, and bearer characteristics.

8. The apparatus as claimed in claim 1, wherein the web services endpoint comprises a transport layer server for terminating the web services protocols.

9. The apparatus as claimed in claim 8, wherein the transport layer server is an HTTP server.

10. The apparatus as claimed in claim 1, wherein the web services endpoint comprises an Extensible Markup Language (XML) messaging engine to parse incoming requests associated with the push messages.

11. The apparatus as claimed in claim 10, wherein the XML messaging engine comprises a Simple Object Access Protocol (SOAP) engine.

12. The apparatus as claimed in claim 1, wherein the web services endpoint includes an interface for advertising which comprises a registry interface to interface with a service registry to advertise a push service of the web services endpoint.

13. The apparatus as claimed in claim 1, wherein the push adaptation layer is coupled to the plurality of push bearers to collect bearer information from each of the push bearers, and coupled to the push router to receive and direct the push messages to the elected one of the push bearers for ultimate delivery to the recipient terminal.

14. The apparatus as claimed in claim 1, wherein at least one of the push bearers is a Short Message Service (SMS) bearer for connecting to a Short Message Service Center (SMSC).

15. The apparatus as claimed in claim 1, wherein at least one of the push bearers is a Wireless Application Protocol (WAP) Push bearer for connecting to a WAP Push Proxy Gateway (PPG) using the WAP Push Access Protocol (PAP).

16. The apparatus as claimed in claim 1, wherein at least one of the push bearers is a Wireless Application Protocol (WAP) Push bearer for connecting to the recipient's terminal via the WAP Push Over-the-Air (POTA) protocol.

17. The apparatus as claimed in claim 1, wherein at least one of the push bearers is a Multimedia Messaging Service (MMS) bearer for communicating multimedia push messages via a WAP MMS protocol.

18. The apparatus as claimed in claim 1, wherein at least one of the push bearers is a Session Initiation Protocol (SIP) bearer to send the push messages via the SIP protocol.

19. A network system for communicating push messages, comprising:
one or more terminals capable of receiving push messages via one of a plurality of push technologies;
one or more web services applications capable of providing the push messages via web services protocols; and
a web services push gateway for interfacing the push messages provided by the web services applications to any of the plurality of push technologies, the web services push gateway configured to parse push messages received from web services applications, collect bearer characteristics from each of a plurality of push bearers respectively associated with the plurality of push technologies, elect one of the push bearers, based on the collected bearer characteristics, convert the parsed push messages to a push protocol associated with the elected push bearer, and route the push messages to the elected push bearer for ultimate transmission to the recipient terminal using the respective push technology.

20. The network system as claimed in claim 19, wherein the web services push gateway comprises:
a first interface to receive the push messages via the web services protocols from the web services applications;
a plurality of different push bearers, each capable of transmitting the push messages to a recipient terminal via a respective push technology; and
a push message router coupled to receive the push messages from the first interface, to process bearer criteria and designate one of the push bearers for transmitting the push messages in response thereto.

21. A method comprising:
receiving at least one push message from web services applications via web services protocols;
terminating the web services protocols and parsing the push message;
obtaining presence information relating to the availability and type of recipient terminal;
obtaining user preference information relating to particular user preferences identified by the user of the recipient terminal;
obtaining bearer characteristics information from each of a plurality of different push bearers each capable of communicating with the terminals using a different push technology;
selecting a push bearer to transmit the push message to the recipient terminal based on the bearer characteristics information;
converting the parsed push message to a push protocol associated with the selected push bearer; and
delivering the push message from the selected push bearer to the recipient terminal using the push technology provided by the selected push bearer.

22. The method of claim 21, wherein selecting a push bearer comprises determining a closest match of the bearer characteristics information with one or more of the presence information and the user preference information.

23. The method of claim 21, wherein selecting a push bearer comprises determining a weighted match of the bearer characteristics information with one or more of the presence information and the user preference information.

24. The method of claim 23, further comprising providing feedback regarding the quality of the selection of the push bearer.

25. The method of claim 21, wherein obtaining presence information comprises querying for information indicative of whether the recipient terminal is currently online.

26. The method of claim 21, wherein obtaining presence information comprises querying for terminal type characteristics of the recipient terminal.

27. The method of claim 21, wherein obtaining user preference information comprises querying for terminal preferences indicative of a range of terminals available as the recipient terminal.

28. The method of claim 27, wherein querying for terminal preference information further comprises querying for content types for each of the terminals available as the recipient terminal.

29. The method of claim 21, wherein obtaining user preference information comprises querying for network preferences indicative of a type of network the user is currently operating within.

30. The method of claim 21, wherein obtaining user preference information comprises querying for presence preferences indicative of user activities at any given time.

31. The method of claim 21, wherein selecting a push bearer includes processing the recipient presence information including the recipient terminal's online status and terminal characteristics.

32. The method of claim 21, wherein selecting a push bearer includes processing the user preferences identified by the user of the recipient terminal.

33. The method of claim 21, wherein the bearer characteristics comprise one or more of bearer bandwidth, content capability, bearer availability, bearer latency, and delivery assurance.

34. The method of claim 21, further comprising parsing the push message upon receipt.

35. The method of claim 21, further comprising processing message transmission parameters to identify transmission guidelines for transmitting the push message from the selected push bearer.

36. The method of claim 35, further comprising buffering the push message prior to transmitting the push message from the selected push bearer, when processing the message transmission parameters reveals postponement of the push message transmission.

37. A computer-readable medium having computer-executable instructions for facilitating the transmission of push messages to terminals utilizing a plurality of different push technologies, the computer-executable instructions performing steps comprising:
receiving the push messages from web services applications via web services protocols;
terminating the web services protocols and parsing the push messages;
collecting bearer availability and capabilities information from each of a plurality of different push bearers each capable of communicating with the terminals using a different push technology;
selecting a push bearer to transmit the push messages to the recipient terminals based on the collected bearer availability and capabilities information;
converting the parsed push messages to a push protocol associated with the selected push bearer; and
delivering the push messages from the selected push bearer to the recipient terminals using the push technology provided by the selected push bearer.

* * * * *